US009081787B2

(12) United States Patent
Bolte et al.

(10) Patent No.: US 9,081,787 B2
(45) Date of Patent: *Jul. 14, 2015

(54) CUSTOMIZABLE FILE-TYPE AWARE CACHE MECHANISM

(71) Applicant: International Business Machines Corporation, Armonk, NY (US)

(72) Inventors: Dirk Bolte, Boeblingen (DE); Herwig Elfering, Boeblingen (DE); Thomas Pohl, Boeblingen (DE); Martin Troester, Boeblingen (DE)

(73) Assignee: International Business Machines Corporation, Armonk, NY (US)

( * ) Notice: Subject to any disclaimer, the term of this patent is extended or adjusted under 35 U.S.C. 154(b) by 133 days.

This patent is subject to a terminal disclaimer.

(21) Appl. No.: 13/664,072

(22) Filed: Oct. 30, 2012

(65) Prior Publication Data

US 2013/0132955 A1    May 23, 2013

(30) Foreign Application Priority Data

Nov. 21, 2011  (EP) .................................... 11189896

(51) Int. Cl.
G06F 9/455    (2006.01)
G06F 17/30    (2006.01)

(52) U.S. Cl.
CPC ...... *G06F 17/30132* (2013.01); *G06F 9/45533* (2013.01); *G06F 17/30091* (2013.01)

(58) Field of Classification Search
USPC ............................................................ 718/1
See application file for complete search history.

(56) References Cited

U.S. PATENT DOCUMENTS

| 6,915,307 | B1 | 7/2005 | Mattis et al. |
| 7,032,089 | B1 | 4/2006 | Ranade et al. |
| 7,809,888 | B1 | 10/2010 | Clark |
| 8,073,990 | B1 | 12/2011 | Baron et al. |

(Continued)

FOREIGN PATENT DOCUMENTS

WO    WO 2012/000879 A1    1/2012

OTHER PUBLICATIONS

Khot et al., Adaptive Filetype Aware Prefetching, Aug 21, 2010, University of Wisconsin-Madison.*

(Continued)

*Primary Examiner* — Emerson Puente
*Assistant Examiner* — Steven Do
(74) *Attorney, Agent, or Firm* — Stephen R. Tkacs; Stephen J. Walder, Jr.; Parashos T. Kalaitzis

(57) ABSTRACT

A caching mechanism is provided in a computer server system including at least one host coupled to at least one disk, one or more virtual machines, one or more images of the one or more virtual machines created in a file system of the disk, and a virtual machine manager for assigning hardware resources of the computer server system to the one or more virtual machines. The mechanism provides a masking cache layer between the one or more virtual machines and the virtual machine manager, the masking cache layer including at least one separate entry for every cacheable data block of the file system to be referenced, collects profiling information related to one or more of the cacheable data blocks (58) and stores the profiling information in the masking cache layer and configures the masking cache layer according to the profiling information, or provides a configuration for the masking cache layer.

20 Claims, 10 Drawing Sheets

(56) References Cited

U.S. PATENT DOCUMENTS

| 8,495,512 | B1 | 7/2013 | Lappas et al. | |
|---|---|---|---|---|
| 2006/0136667 | A1* | 6/2006 | Shultz et al. | 711/118 |
| 2008/0201528 | A1* | 8/2008 | Hsu et al. | 711/125 |
| 2009/0070771 | A1 | 3/2009 | Yuyitung et al. | |
| 2010/0070715 | A1 | 3/2010 | Waltermann et al. | |
| 2011/0148895 | A1 | 6/2011 | Burckart et al. | |
| 2011/0173370 | A1 | 7/2011 | Jacobs et al. | |
| 2011/0173616 | A1 | 7/2011 | Lattmann et al. | |
| 2011/0214122 | A1 | 9/2011 | Lublin et al. | |
| 2012/0144389 | A1 | 6/2012 | Hicks et al. | |

OTHER PUBLICATIONS

Response to Examination Report under Section 18(3) filed Oct. 1, 2013, Application No. GB1220041.6, 7 pages.
U.S. Appl. No. 14/304,203, 1 page.
U.S. Appl. No. 13/766,229, 1 page.
U.S. Appl. No. 13/661,314, 1 page.
"Fast Virtual Disk (FVD) for QEMU", IBM Corporation: http://researcher.watson.ibm.com/researcher/view_project.php?id=1852, Jan. 2011, 5 pages.
"Future Work", http://www.usenix.org/event/wiov08/tech/full_papers/liguori/liguori_html/node5.html, Retrieved from internet on Sep. 19, 2012, 2 pages.
Biswas, Susmit et al., "Multi-Execution: Multicore caching for Data-Similar Executions", ISCA '09 Proceedings of The 36th Annual International Symposium on Computer Architecture, Austin, TX, Jun. 20-24, 2009, 10 pages.
Gupta, Diwaker et al., "Difference Engine: Harnessing Memory Redundancy in Virtual Machines", OSDI '08 8th USENIX Symposium on Operating Systems Design and Implementation, San Diego, Dec. 8-10, 2008, 14 pages.
Koller, Ricardo et al., "I/O Deduplication: Utilizing Content Similarity to Improve I/O Performance", ACM Transactions on Storage (TOS), vol. 6, Issue 3, Sep. 2010, 14 pages.
Min, Jaehong et al., "Efficient Deduplication Techniques for Modern Backup Operation", IEEE Transactions on Computers, Issue Date: Jun. 2011, Volume: 60 Issue 6, pp. 824-840. http://www.dmclab.hanyang.ac.kr/files/publication/journals/international/TC-2009-11-0573.R1_Won.pdf).
Combined Search and Examination Report under Sections 17 and 18(3) dated Apr. 23, 2013, Application No. GB1220041.6, 5 pages.
Combined Search and Examination Report under Sections 17 and 18(3), GB Application No. GB1219733.1, dated Mar. 20, 2013, 4 pages.

* cited by examiner

CUSTOMIZABLE FILE-TYPE AWARE CACHE MECHANISM

BACKGROUND

The invention relates to a customizable file-type aware cache mechanism.

During the creation of a virtual machine (VM) on a host within a cloud computing environment, there is usually the challenge to create the corresponding image file in a very fast way.

Virtual machines are also known as virtual hosts, while a host is also called a server. Hosts are computer systems comprising at least one central processing unit (CPU); they may comprise a local disk too, but this is not mandatory. They may be connected to a network system where they can use a shared file system on at least one network disk via an input/output (IO) infrastructure.

Typical cloud offerings provide a set of predefined configurations. These configurations are associated with a certain file image of a virtual disk, also called virtual machine image. Creating such an image based on a predefined installation either requires a complete installation procedure to run or to copy and to customize an existing image.

Another approach to achieve this is to use the so-called snapshot or backing-file feature available for some image file formats: A common base image is used read-only (RO). A new image is created which references the base image. Every write operation is now done to the new image while the base image remains unchanged. This approach reduces the creation time from 10 minutes down to a few seconds. Another benefit of this approach is the reduced disk and cache usage as many operations on the base image are done on the very same file.

To allow failovers and independence of images from their host, shared file systems are usually used in multi-server environments. Such a system does not scale very well, if e.g. a single host can run ten virtual machines in parallel, already ten hosts of such a configuration result in one hundred virtual machines accessing the same shared file system at the very same time. The access pattern of hundred virtual machines running in parallel is equivalent to random access, causing regular non-flash-disks to search back and forward all the time.

Therefore, the configuration has to reduce the IO operations as much as possible to prevent disk accesses where possible. Although flash devices do not face the search time impact conventional hard disks see, it is still desired to prevent disk accesses where possible, e.g. to extend flash chip lifetimes. An easy solution to this problem is to use large caches and to consolidate write operations.

The heuristic an operating system (OS) uses to determine which data to keep in cache is dependent on many factors. Nevertheless a misuse of a virtual machine resulting in heavy input/output (IO) operations might break the environment as caches might be used for other tasks.

For an environment with one or several base images it is desirable to keep as much data in cache as possible or even to customize which data to keep in cache.

Another issue arises when running in an environment where several images are provided to a customer. Although all images are quite similar and only vary in a small subset of files within the disk image, the images are still seen by the server OS as distinct files.

State of the art approaches to minimize data duplication in memory utilizing hashes do not scale very well and only work on small memory sizes as the search overhead grows massively with the cache size. Providing cache sizes of several Gigabytes renders these approaches useless.

Several state of the art mechanisms exist for limiting the amount of data in a cache in general, as well as for finding and removing duplications in particular. The solutions known in the prior art either use caches with a heuristic which cannot be configured or just copy every data block/file which is accessed.

US2011/0148895 A1 describes how to start the image and clones snapshots which have a pre-filled cache. This approach reduces the cache pages to be stored. US2011/0148895 A1 discloses caching by determining file blocks to be cached based on the validity and performance of a cache entry. A cache image including only cache entries with valid durations of at least a configured deployment date for an image is prepared via an application server for the image. The image is deployed to at least one other application server as a virtual machine with the cache image including only the cache entries with the valid durations of at least the configured deployment date for the image.

SUMMARY

It is an object of the invention to provide a caching method for operating a computer server system.

Another object is to provide a system for executing the caching method for operating a computer server system.

The objects are achieved by the features of the independent claims. The other claims, the description and the drawings disclose advantageous embodiments of the invention.

In a first illustrative embodiment, a caching method is proposed. The method comprises providing a masking cache layer between one or more virtual machines and a virtual machine manager, the masking cache layer including at least one separate entry for each cacheable data block of a disk file system to be referenced. The method further comprises collecting profiling information related to one or more of the cacheable data blocks and storing the profiling information in the masking cache layer. The method further comprises configuring the masking cache layer according to the profiling information.

In another illustrative embodiment, a computer program product stored on a computer readable storage medium is proposed, which comprises computer readable program code for causing a computer to perform the various ones of, and combinations of, the operations outlined above with regard to the method illustrative embodiment.

A further aspect of the invention is a data processing system for execution of a data processing program comprising software code portions for performing various ones of, and combinations of, the operations outlined above with regard to the method illustrative embodiment.

BRIEF DESCRIPTION OF THE SEVERAL VIEWS OF THE DRAWINGS

The present invention together with the above-mentioned and other objects and advantages may best be understood from the following detailed description of the embodiments, but not restricted to the embodiments, wherein is shown in:

FIG. 3b shows a concept for the use of the masking cache layer shown in FIG. 3a;

DETAILED DESCRIPTION

Figure 1:
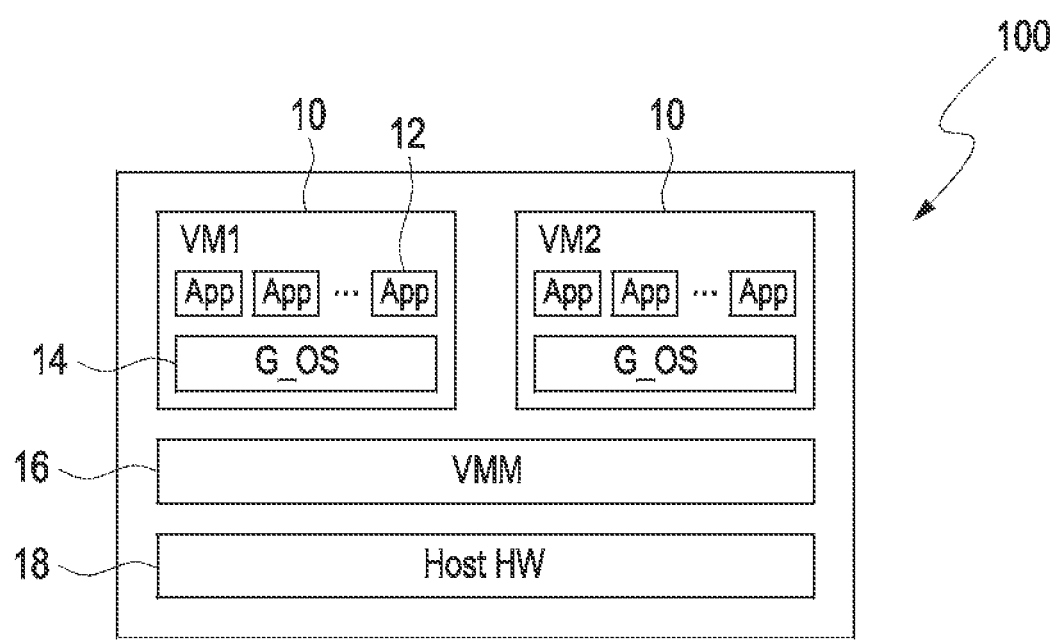
FIG. 1 is a depiction of a cloud concept of running virtual machines on a host system, administrated by a virtual machine manager (VMM) according to the state of the art.

In accordance with the illustrative embodiment, a caching method and system for operating a computer server system may apply to a network system connected to or comprising a local area network (LAN) as well as may apply to a storage area network (SAN) system.

The illustrative embodiments make available a caching mechanism for a customizable cache. The caching mechanism comprising the masking cache layer allows to "pin" certain cacheable data blocks in cache, for instance based on profiling information gathered for configuring the masking cache layer or a predefined configuration, thereby boosting the overall system performance by reducing disk access times and IO bandwidth due to a reduction of disk interactions. An additional combination with file-type awareness provides additional flexibility, allowing to boost performance for files which weren't explicitly profiled before. Using the capability to interpret files to optimize their caching also provides new opportunities to optimize data merging as an easy and fast way to navigate to data which are potentially equivalent.

A data block is to be understood as the minimum units for read/write—access on a hard disk, mostly in quantities of at least 512 bytes. Hard disks are usually divided in logical data blocks. Data blocks are uniquely addressable units on hard disks.

A virtual machine (VM) is a completely isolated guest operating system (G_OS) installation within a normal host operating system, being a software implementation of a machine, i.e. a computer, which executes programs like a physical machine. The virtual machine is one operating system (OS) that is being managed by an underlying control program allowing it to appear to be multiple operating systems. Modern virtual machines are implemented with either software emulation or hardware virtualization or, in most cases, both together. Virtual machines are separated into two major categories, based on their use and degree of correspondence to any real machine. A system virtual machine provides a complete system platform which supports the execution of a complete operating system (OS). In contradistinction to this, a process virtual machine is designed to run a single program, which means that it supports a single process. An essential characteristic of a virtual machine is that the software running inside is limited to the resources and abstractions provided by the virtual machine.

In computing, a virtual machine manager (VMM), also called hypervisor, is one of many hardware virtualization techniques that allow multiple operating systems, termed guests, to run concurrently on a host computer. It is named like that because it is conceptually one level higher than a supervisory program. The VMM presents to the guest operating systems a virtual operating platform and manages the execution of the guest operating systems. Multiple instances of a variety of operating systems may share the virtualized hardware resources. Hypervisors are installed on host hardware whose only task is to run guest operating systems. Non-hypervisor visualization systems are used for similar tasks on dedicated host hardware, but also commonly on desktop, portable and even handheld computers. The VMM provides the means for simultaneous use of cloud facilities. VMM is a program on a host system that lets one computer support multiple execution environments which can be identical or similar or have different hardware configuration. From a user's point of view, the system is a self-contained computer which is isolated from other users. In reality, every user is being served by the same machine. In cloud computing, VMM allows users to monitor and thus manage aspects of the process such as data access, data storage, encryption, addressing, topology, and workload movement.

The process of deploying a virtual machine first implies that at least one virtual image is created, in a file system. Later, a virtual machine configuration may be created using this image file and then a VMM on a host may get the information to deploy the virtual machine with this configuration.

The illustrative embodiments are particularly advantageous for computer systems being so called cloud computing environments. While generic memory pinning boosts system performance for many usage scenarios, exploiting it in cloud computing environments provides massive benefits. Advantageously, frequently accessed cacheable data blocks reside in memory, so that their access time is extremely low. For the remaining cacheable data blocks, the disk interaction is also accelerated as more IO bandwidth remains. Traditional cache algorithms do not recognize identities between different image files as they cache each file independently, which causes the cache to keep identical data in memory multiple times. They do not adapt the caching behavior to a profiled usage pattern. Exploiting this feature for instance with profiling, the speed of a virtual machine may be optimized in a significant way.

A disk image file used for virtualization environments is often described as cloud computing environment. Although the specific implementation varies, the basic concept for disk image files stays the same: a disk image file represents a virtual hard disk, including master boot record, partition table, partitions and file systems.

Expediently, certain cacheable data blocks of an image file which contain directories/files/inodes that are accessed the most may be kept in memory while for all other areas the regular caching approach may be more effective.

While the state of the art options to optimize file caches either just copy every cacheable data block/file which is accessed while pushing out the oldest accessed data or use heuristics to manage the cache data, the illustrative embodiments allow for optimization by configuring the cache management.

Expediently, a profitable and customizable cache for a dedicated file system, particularly being also aware of the file type it is interacting with, can be implemented and provides better characteristics with regards to cache size and speed.

With file-type awareness, data merging in cache reaches a new level for cloud, computing environments with similar images as a fast and easy search algorithm is available. Combined with selective memory pinning described here, the search scope can be reduced even more, thus further optimizing the memory usage.

An additional masking cache layer is provided, which may be created in memory, and may be implemented as a memory file system, which is configured as a file system or a subdirectory of a file system, over the actual file system. The virtual machine manager can interact with this masking cache layer to pull profiling information and push usage information. The masking cache layer can either be provided with a predefined configuration including a rule or a rule set for deciding whether cacheable data blocks are to be kept or not, or be provided with a generated configuration derived from profiling information, e.g. from profiling information of files. A rule set can either specify which cacheable data blocks to store in memory or which information based on the file type to keep in memory.

The virtual machine manager can establish a profiling for a certain file. A simple case of profiling could be an access count, and simply storing which cacheable data blocks are accessed how often. Based on this profiling data a rule set can be created telling the masking cache layer how to handle that file, i.e. the rule set tells the masking cache layer which data blocks to store (copy-on-read) and which data blocks to retrieve from the file system instead. With this approach it is accomplished that performance critical cacheable data blocks are kept in memory ail the time. This approach works particularly for a single file per rule set as data blocks may differ for different base images. Other possibilities of profiling comprise the use of data content of cacheable data blocks or path information for fast access of cacheable data blocks.

An extended version of this profiling may interpret the target image file and associates blocks with files, directories or inodes. This pattern can be used for creating a more generic rule set which can be applied to different base images.

An expedient development to that is to make the masking cache layer aware of file-types. In case of image files, the masking cache layer can interpret the files at access. By specifying a rule or rule set using path information of the image file system, the masking cache layer parses each request and stores the content in cache if the request matches a specified pattern.

The file-type awareness described with respect to the illustrative embodiments can also be utilized to provide an optimized search for cacheable data blocks with similar data. As only a subset of the data is kept in memory and as for each cacheable data block within a file-type a navigation path is available, the masking cache layer can directly navigate to any location in image files and compare if cacheable data blocks at the same path within the images are indeed identical. By this, equality (also called communality) can be found much faster as if all the cacheable data blocks or their hashes would need to be compared to find duplications. In case a lot of similar images running at the same time, the cache utilization of such environments can be reduced drastically, which allows to keep more data in cache and thereby to boost the performance of these images.

As the additional masking cache layer may be working like a simple proxy even without configuration, the masking cache layer may be of benefit for creating image files for virtual machines by forcing the following steps for cacheable data block access: (a) deciding on a read operation related to one or more cacheable data blocks whether or not the one or more cacheable data blocks are already stored in the masking cache layer, and passing the read operation to the underlying file system when the one or more cacheable data blocks are not stored in the masking cache layer and keeping the one or more cacheable data blocks in the masking cache layer when already stored, and (b) deciding on a write operation related to one or more cacheable data blocks whether or not a specification exists which requires storing the one or more cacheable data blocks changed by the write operation, and else pass the write operation to the underlying file system. The benefits of such a caching approach is that standard operations on images can be done much faster with less IO operations and caches are used more effectively.

Advantageously, an algorithm may be derived from the cacheable data block access profiling information to be used for deciding if a cacheable data block is loaded in the server system to describe the proposed method in detail for implementation.

In one embodiment, the method may also provide a way a communality map between at least two or more image files can be used for deciding if a cacheable data block is to be loaded in the server system. In one example embodiment, the communality map may be used as a static association table to be derived prior to virtual machine execution. In another example embodiment, the communality map may be derived as a dynamic association table during virtual machine execution for a dynamic loading of a new file at runtime. The way the communality map may be used can be the following: a cache configuration may be specified containing cacheable data blocks of files to be kept in memory; cacheable data blocks of the files covered by the algorithm are compared which each other; the cache layer may create a communality map specifying common cacheable data blocks and individual cacheable data blocks; on read access, the algorithm may follow the map to find the right data block to be loaded.

One advantage over regular caching approaches is that a guaranteed set of data is kept in memory. Regular caches usually remove cached data sets based on the current usage of the system. By keeping data for important operations in the memory all the time, certain performance-critical operations can always be performed fast.

One further advantage over existing approaches using copy-on-read is that the set of cacheable data blocks actually stored can be reduced to certain files and to certain cacheable data blocks/files in an image file, thereby reducing the memory usage. As memory is still a limiting factor, reducing its usage allows more files to be stored in the masking cache layer.

Such an optimization of the caching mechanisms according to the inventive method boosts performance especially in visualization environments with the following usage patterns:

VMs starting with an equivalent image content without using base images.

Varieties of an OS installation only differing in small amounts, e.g. by having an additional software installed (such as e.g. a database, a web server).

Different levels of an OS or installed software, e.g. when developing a software component which is tested in that VM or when verifying different OS levels with only a small set of patches installed.

In the drawings, like elements are referred to with equal reference numerals. The drawings are merely schematic representations, not intended to portray specific parameters of the invention. Moreover, the drawings are intended to depict only typical embodiments of the invention and therefore should not be considered as limiting the scope of the invention.

FIG. 1 shows schematically a generic computer system according to the state of the art in the realization of a host system 100, comprising a host hardware (HW) 18 and a software system, called virtual machine manager (VMM) 16, which represents the interface to several virtual machines (VM1, VM2) 10 running on the host system 100. The known host system 100 may be coupled to a disk (not shown) or such a disk may be included in the host hardware 18. Each virtual machine 10 (indicated as VM1, VM2 in FIG. 1) comprises a guest operating system (G_OS) 14, running several user applications 12.

Figure 2:
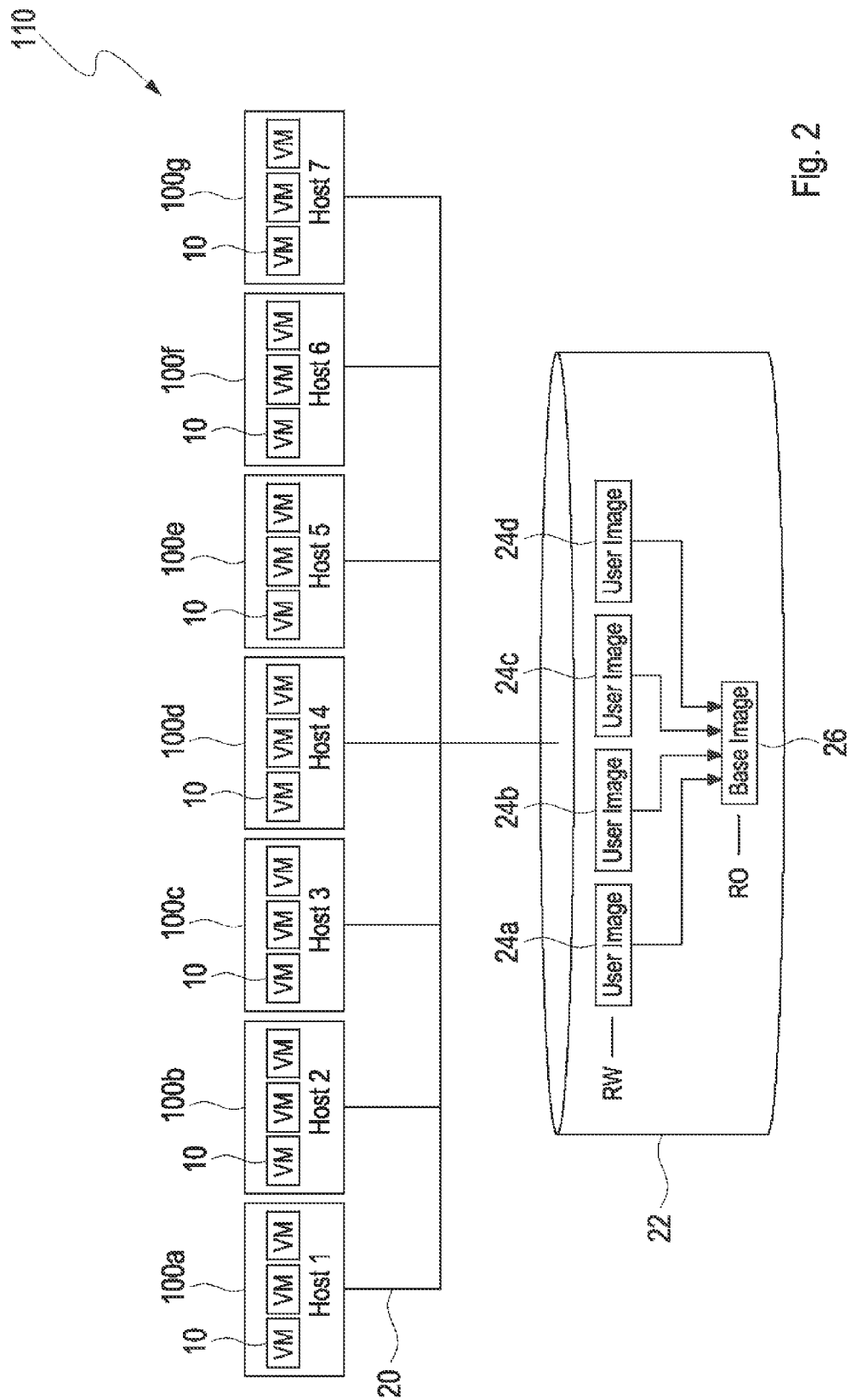
FIG. 2 depicts an example of a computer server system, comprising a variety of hosts and a disk, with several virtual machines running on the each host according to the state of the art.

In FIG. 2 an example of a cloud-like environment of a computer server system 110 according to state of the art, comprising several virtual machines 10 running on the same host is shown for a variety of hosts 100a . . . 100g, all connected to a common disk system 22 via an input/output (IO) system 20. The disk system 22, e.g., comprises a shared file system of the computer server system 110. Also shown in FIG. 2 is the separation between a read-only (RO) base image 26 and a variety of read-write (RW) user images 24a . . . 24d. The common base image 26 serves for improving creation time and IO performance when creating virtual images, as described herein. Its function will be described in more details hereafter. Yet this realization of base image derived user images with one single layer of base images is only one possibility of creating virtual machines; other embodiments may consider configurations with more than one layer of base images depending on the specific usage of the computer server system 110.

Figure 3A:
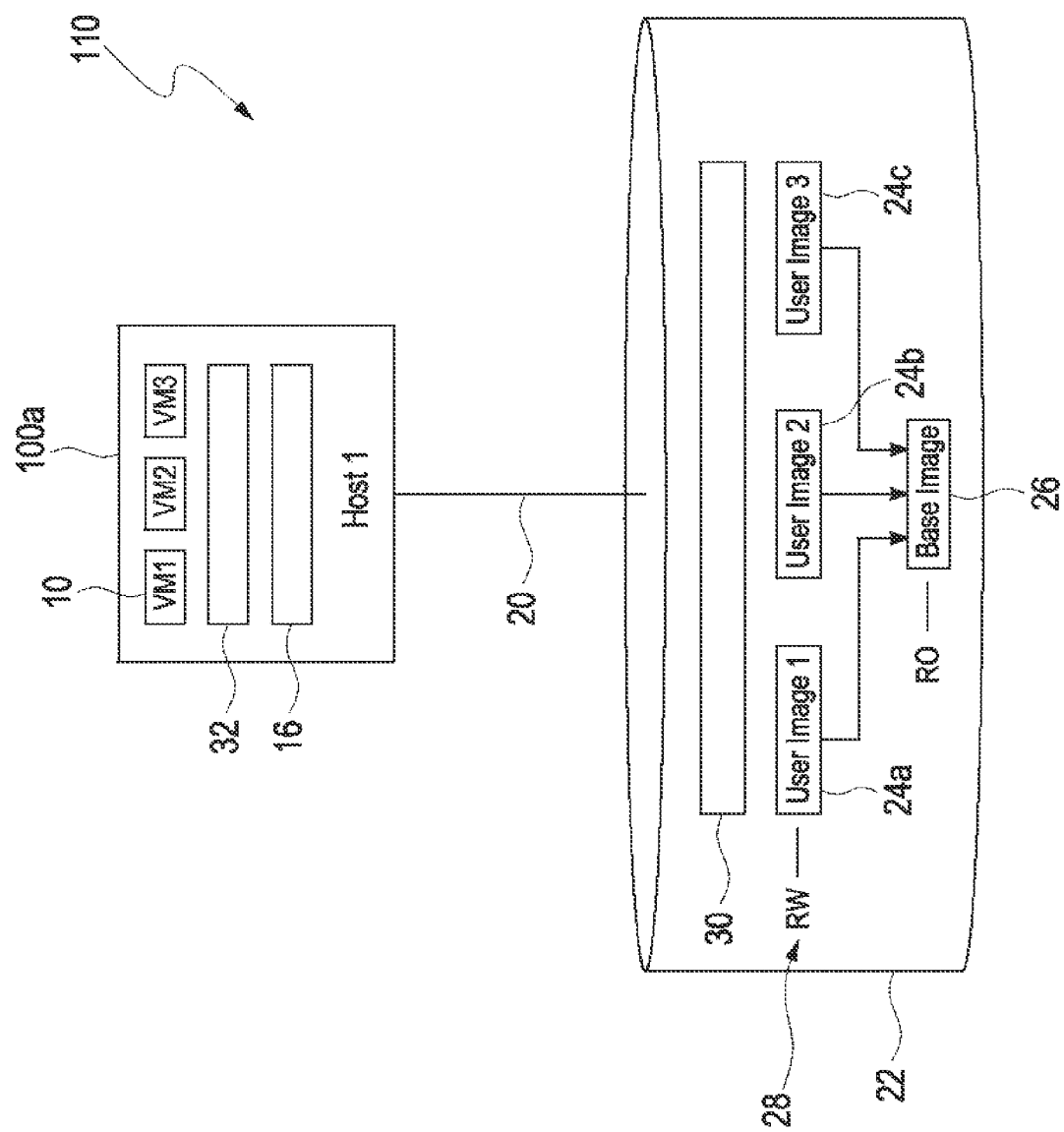
FIG. 3a depicts an example embodiment of a computer server system, displaying a masking cache layer between virtual machines and a file system of the disk, a file system cache, respectively, and a virtual machine manager.
Figure 3:
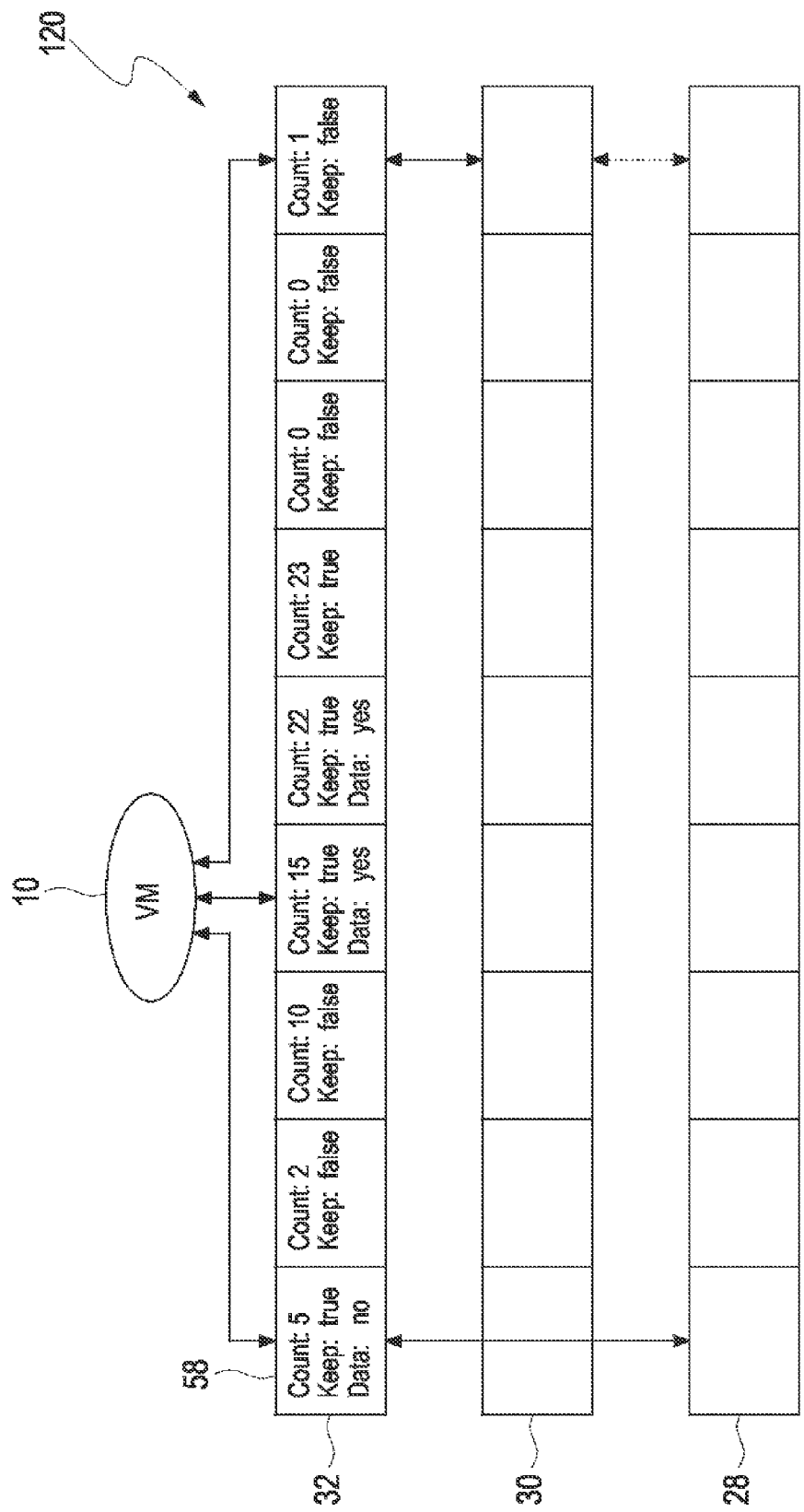

FIG. 3a depicts an example embodiment of a computer server system 110, displaying a masking cache layer 32 between virtual machines 10 and a file system 28 of a disk 22, a file system cache 30, respectively, and a virtual machine manager 16. FIG. 3b illustrates a concept for the use of the masking cache layer 32 shown in FIG. 3a.

The computer server system 110 includes at least one host 100a-100g coupled to at least one disk 22, one or more virtual machines 10, one or more images 24a-24d of the one or more virtual machines 10 created in a file system 28 of the disk 22 and a virtual machine manager 16 for assigning hardware resources of the computer server system 110 to the one or more virtual machines 10. A masking cache layer 32 between the one or more virtual machines 10 and the virtual machine manager 16 is provided, the masking cache layer 32 including at least one separate entry for every cacheable data block 58 of said file system 28 to be referenced. Profiling information related to one or more of the cacheable data blocks 58 is collected and stored in the masking cache layer 32. The masking cache layer 32 is configured according to the profiling information, or a configuration is provided for the masking cache layer 32.

The above mentioned masking cache layer 32 implemented between the virtual machines 10 over the file system 28, the file system cache 30 of the disk 22 and the virtual machine manager 16, is shown for a computer server system 110 similar to FIG. 2 for an example with one host 100a only. The masking cache layer 32 may be implemented as a memory file system, which is configured to represent a file system or a subdirectory of the file system layer 28 and its related file system cache layer 30. In this example embodiment, the masking cache layer 32 has the dedicated purpose to act as a customizable masking cache layer, the function of which is shown in more details in FIG. 3b indicating the inventive caching mechanism 120.

This additional masking cache layer 32 may be configured according to a predefined rule set, the rule set comprising at least one rule, if information from heuristics is used. Such a method is a relatively convenient way of deriving the decision for a cacheable data block 58 to be cached or not.

A more flexible way is to use profiling information according to a rule set derived and adapted to the present situation of deploying images during creation of virtual machines 10 and configuring the masking cache layer according to this dynamically generated information.

For every cacheable data block 58 of the file system 28 which is referenced, a separate entry in the customizable masking cache layer 32 exists. It stores at least the following information:

Profiling information (e.g. a counter): Various information can be stored to profile access patterns to a certain cacheable data block 58 which can be used later on for optimizing the caching behavior;

Keep: an indicator specifying whether or not a cacheable data block 58 should be kept in memory after first access;

The cached cacheable data block 58.

Preferably profiling information about access patterns of the one or more cacheable data blocks 58 of the file system 28 to be referenced may be provided for the rule set. For profiling data block access rates advantageously a counter may be used for counting single cacheable data block accesses and providing this information to a separate rule of the rule set. The method of gathering such profiling information in different ways is described hereafter.

Expediently, the read flow for loading data is adapted for profiling: a profiling step has to be integrated right after a read/write request was received. This step may be implemented in different ways. A straightforward way is incrementing a counter for each read or write request. The profiling data can be dumped and used for configuring the masking cache layer 32 later on to specify which cacheable data blocks 58 to keep and which not. The masking cache layer 32 acts as a kind of "pass-through" between the virtual machines 10 and the file system 28.

Information of the counter for profiling data block access rates may serve for deriving the rule set for the cacheable data block access behavior and hence for the decision whether a cacheable data block 58 may be kept or not in the masking cache layer 32. A rule set can either specify which cacheable data blocks to store in memory or which information based on the file type to keep in memory. For disk images a rule set can specify which files are to be kept.

Figure 4:
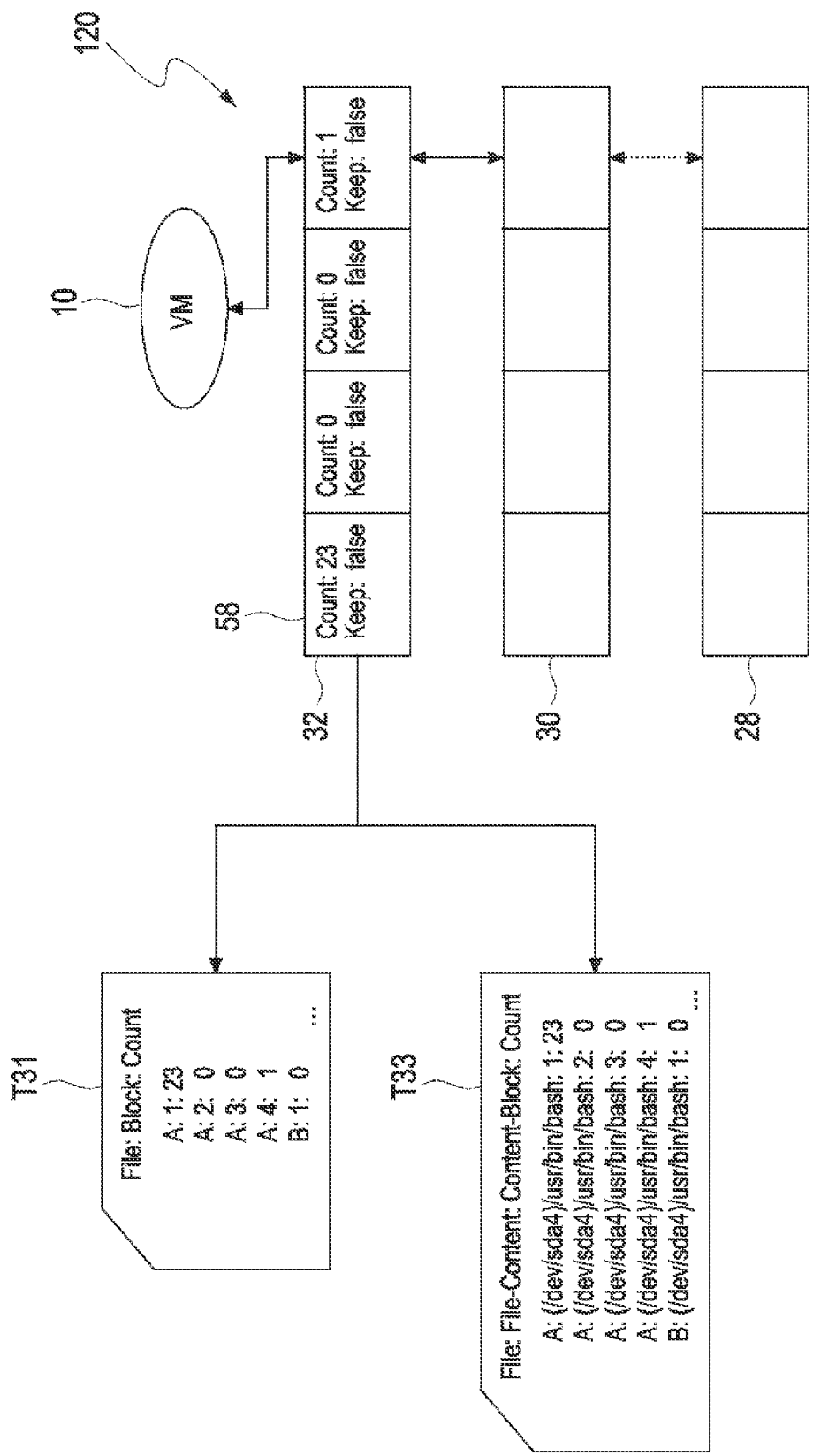
FIG. 4 shows a concept for profiling data by recording data block access rates in one embodiment.

An example for the counter is illustrated in FIG. 4. For instance, cacheable data block 1 has a high count of 23, cacheable data block 4 has a count of 1, while the other counts are 0, indicated in table T31, and in a case where the data to be analyzed may be found as indicated in table T33.

In a further embodiment, information about the content of the one or more cacheable data blocks 58, i.e. the information which is stored in the cacheable data blocks 58, may be used for profiling data block access rates.

An extension to profiling is to make it file-type aware as well. Depending on the plug-in providing the interpreter for a specific file-type, the information collected and dumped may differ. For disk image files, file-type awareness would allow to exactly record which file within a certain partition is accessed.

Profiling information can be used to create configuration files and to decide whether a cacheable data block 58 may be cached or not.

The cache implementation of the masking cache layer 32 has a logic that is able to determine file types to optimize caching behavior and to support a more generic way to specify which cacheable data blocks should be kept in memory. Instead of specifying a dedicated cacheable data block of a file or several files, file-type awareness allows to define a generic description for specific files. Thereby the caching optimization is not only available to those files profiled upfront but can be specified in a generic way, allowing to support future needs. In addition, file-type awareness simplifies administration of the cache significantly, as the administrator, i.e. the virtual machine manager, does not have to specify pinning on cacheable data block identifiers, but on file names and other information.

Some examples for better understanding are as follows:

In a database file, cacheable data blocks containing the index are kept in memory permanently.

For certain executables (e.g. /bin/bash on LINUX systems), the code segment is kept in memory. LINUX is a registered trademark of Linus Torvalds in the United States, other countries, or both.

For file systems, directories accessed very often are kept in memory.

For disk image files, certain cacheable data blocks of encapsulated files (e.g. /bin/bash on /dev/sda4 within the image file) are kept in memory.

The implementation of the method may allow extending this functionality using a plug-in concept. Thereby, the exact configuration content can be interpreted by each plug-in and can be adapted to the specific usage scenario. If no specific logic for a file type is implemented, the generic approach of the masking cache layer applies which allows to specify certain cacheable data blocks to keep in cache by referencing their number in the file.

In the following description, the example of disk image files used for virtualization environments is used. Although the specific implementation varies, the basic concept for disk image files stays the same: a disk image file represents a virtual hard disk, including master boot record, partition table, partitions and file systems. With no restriction the same method can be used for caching data blocks of databases or graphical information like pictures.

A file-type aware cache for this kind of files may provide the following functionality:
find partitions in disk image file;
interpret file systems within that partition;
navigate to files within the file system of the partition;
Either find a cacheable data block location for a certain file or interpret a generic target description like 'code segment'.

Without any configuration, the masking cache layer 32 (in the function as a cache layer) passes every incoming read or write request to the underlying layer as no information is available which cacheable data blocks to keep in memory. This is the default behavior.

Figure 5:
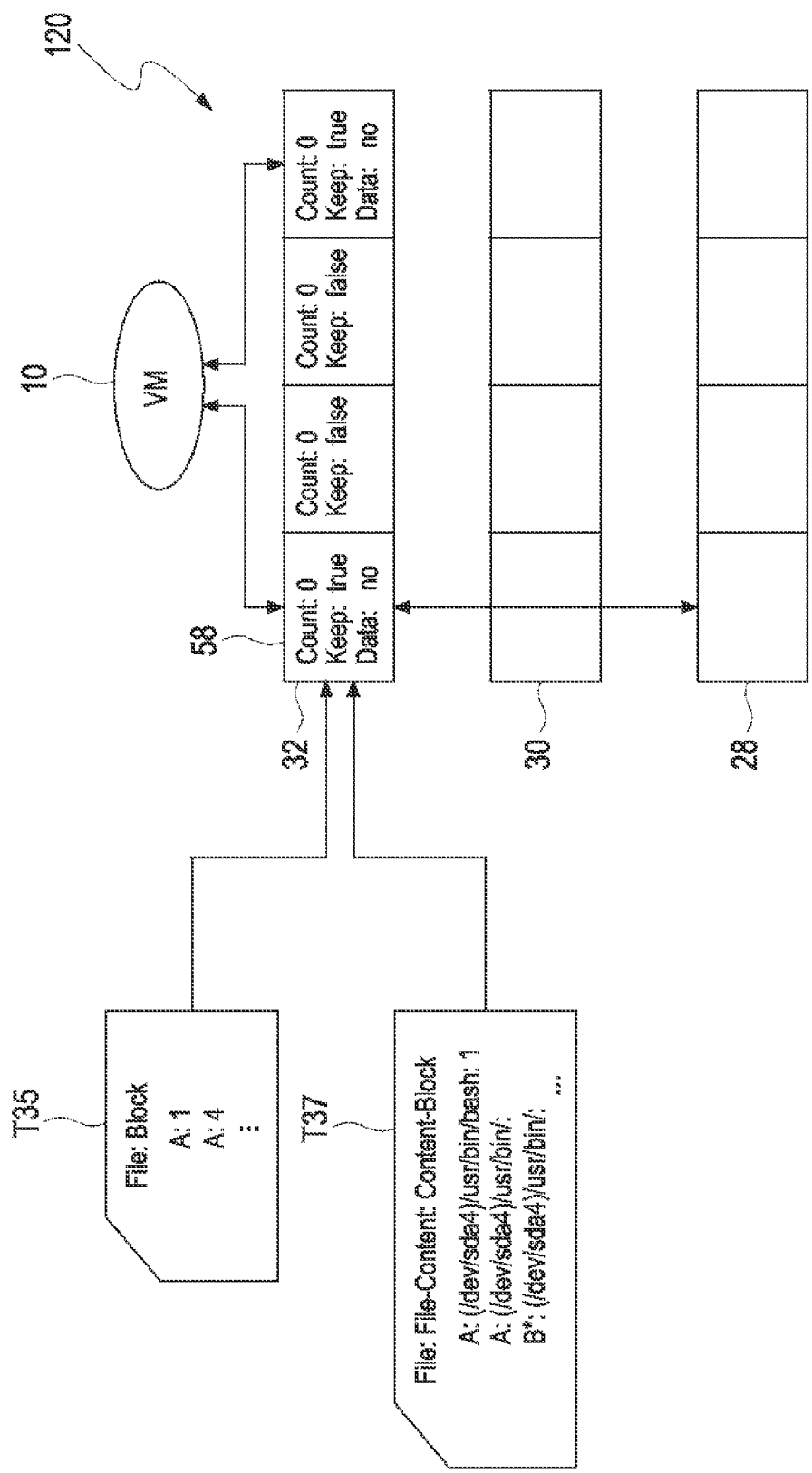
FIG. 5 depicts an example of cache configuration by using information about file types for profiling data block access behavior according to an illustrative embodiment.

To exploit the functionality of this masking cache layer, a configuration has to be loaded. FIG. 5 shows two examples for loading a configuration. The upper configuration, table T35, does not use file-type awareness. Instead, it specifies that for a file 'A', certain cacheable data blocks (data blocks 1 and 4) should be kept in memory, as indicated in table T35. This information is kept in the masking cache layer 32, either by applying it immediately to the entries reflecting the file, or by applying if to the file when first accessing a file matching the file name.

For file-type awareness, indicated in table T37, the configuration has to be specific to the plug-in for that file-type to represent more generic information. For disk image files, the information in this file has to specify a partition, a file within that partition and additional information on which cacheable data block of that inner file to store (e.g. by referencing these cacheable data blocks directly or by giving an abstract description like 'code segment').

Independent from whether file-type awareness is used or not, file names and cacheable data block specification can be specified using search patterns like regular expressions.

All the information about a data block access rate may be used for deciding if a cacheable data block 58 is to be loaded in the host system 18 and kept in memory.

In the same way, according to another aspect of the illustrative embodiments, the information about a file type of a data file to be referenced may be used, as one possible realization of a rule in the rule set, for deciding if a cacheable data block 58 is loaded in the host system 18 and kept in the masking cache layer 32.

Another embodiment may use the possibility of specifying a rule set using path information of the image file system; thus the masking cache layer parses each request and stores the content in cache if the request matches a specified pattern. One example would be to specify a rule forcing every file access request to directory /usr to be cached results in faster access to these files, thereby reducing startup times significantly for these programs.

Advantageously an algorithm 130 is derived from the cacheable data block access profiling information to be used for deciding if a cacheable data block 58 is loaded in the host system 18 and kept in memory. The algorithm 130 is described in detail hereafter.

Figure 6:
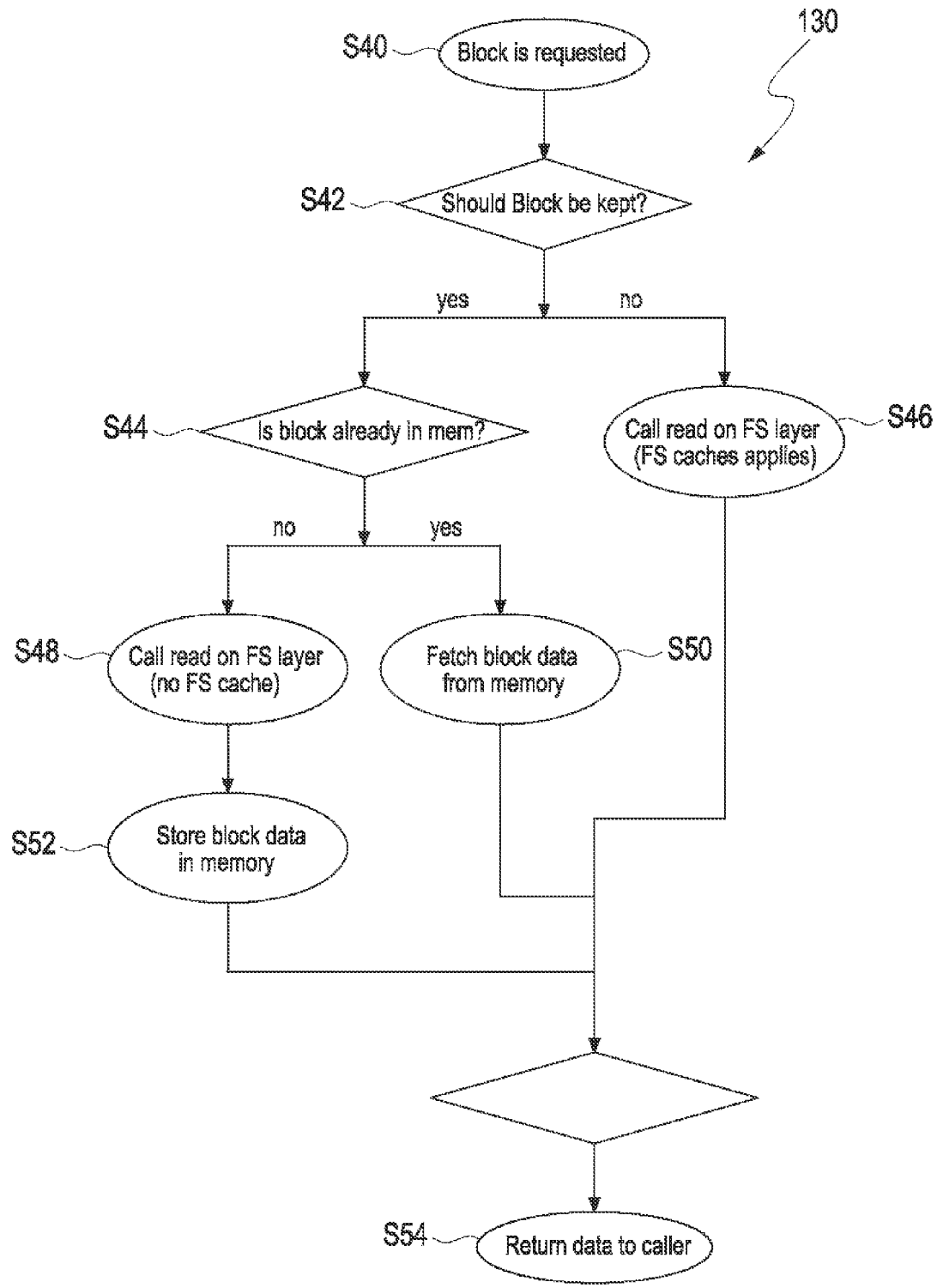
FIG. 6 is a flowchart of operation of a read sequence for cache configuration according to illustrative embodiment.

The masking cache layer 32, serving e.g. as an additional cache layer, implements a certain flow for read access on a cacheable data block. In FIG. 6 a sample implementation for fulfilling the purpose of the method is shown as a flow chart. Other flows may be acceptable as well.

A data block (cacheable data block 58) is requested in step S40. This is the basic read request passed to a file system (FS) implementation. The masking cache layer 32 provides the same interfaces as any other file system.

In step S42 it is requested whether or not the cacheable data block should be kept. The accessed cacheable data block is checked on whether it should be kept in memory or read directly from the reflected file system. If the answer is not to be kept in memory (no in the flow chart) step S46 performs a call read on the file system layer (FS caches applies (FS=file system)) and the access is passed-through to the reflected file system.

If the cacheable data block should be kept (yes in the flow chart) it is requested if the cacheable data block is already in memory in step S44. The masking cache layer 32 checks on whether the data is already cached in step S44. When the data is not in cache yet (no in the flow chart), a direct call to the file system is issued by call read on FS layer (no FS cache applies) in step S48. In step S52 the block data is stored in memory, i.e. the data returned is stored in masking cache layer.

In case the cacheable data block is already in the masking cache layer (yes in the flow chart), this data is taken without accessing the file system in step S50 "fetch block data from memory". Finally, all three paths do the same by returning the data to the requesting application in step S54.

The write flow can be implemented in a similar way as the read flow: when data are kept in memory, both data in cache as well as on the file system have to be updated. The write flow supporting duplication detection is different and described below.

In a further embodiment a communality map between at least two or more image files can be used for deciding if a cacheable data block 58 is to be loaded in the host system 18, as described in more details hereafter.

Data merging as used by the inventive method is an advantageous method for environments with several disk images being used in parallel, having only a small difference.

Figure 7:
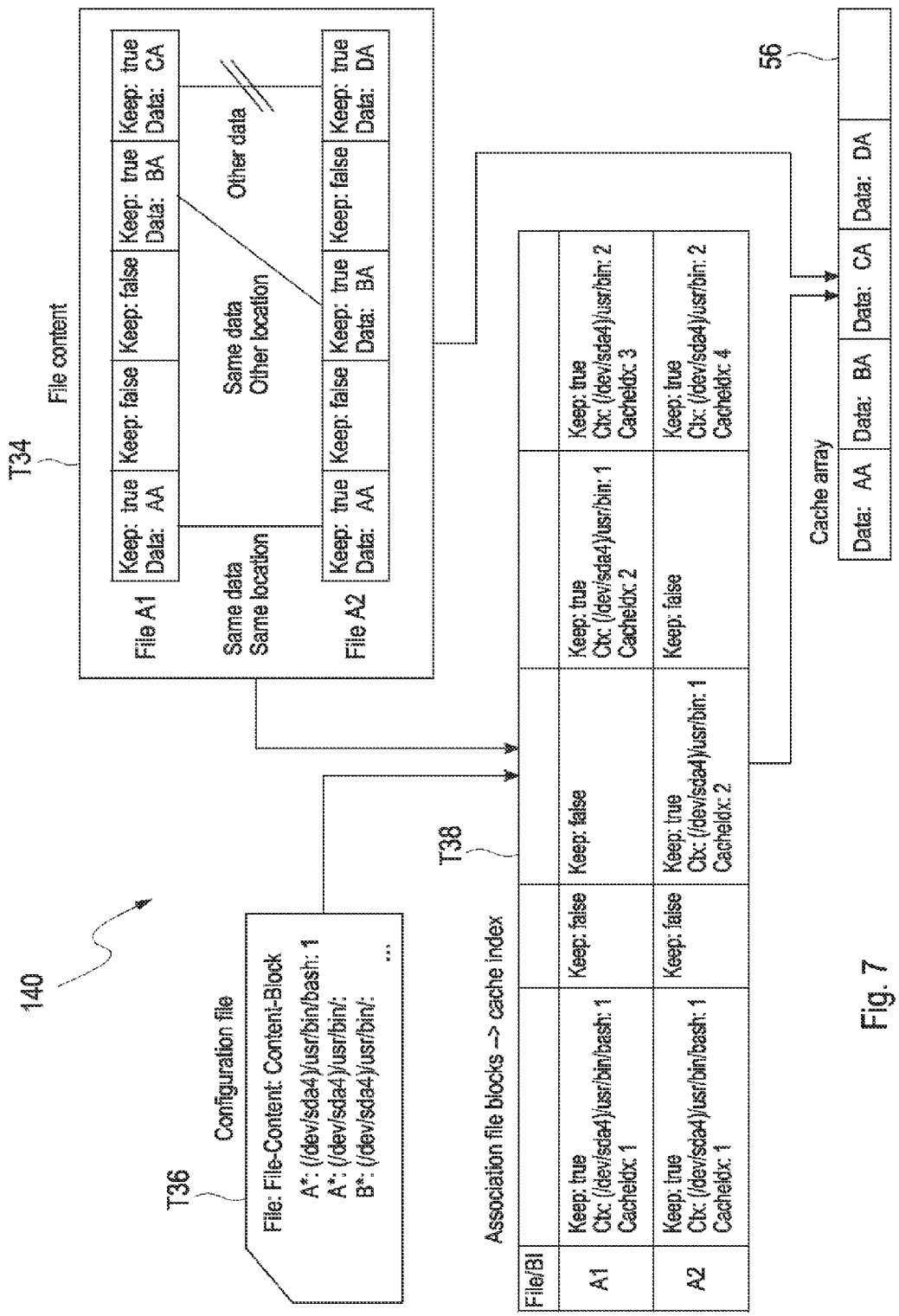
FIG. 7 shows a concept of a cacheable data block/file access method for cache configuration using a communality map according to an illustrative embodiment.

The configuration for this feature is similar to a configuration for a file-type. The masking cache layer requires a different internal structure to be capable for this feature. FIG. 7 shows an example implementation, namely a concept for using a communality map 140 according to the illustrative embodiment.

The configuration file T36 describes which information to keep in memory. In this example, it specifies navigation information within a disk image file (partition, file location in that partition as well as cacheable data block specification). This information is stored within the masking cache layer 32 and is used to derive a file specific map. As duplication should be reduced, an additional indirection is required.

For each file T34, a map in the association table T38 of this example is stored, specifying both the location of the cacheable data block within the file (context, Ctx) as well as the location of the cached data (Cache array 56), e.g. a cache index (CacheIdx). Advantageously the cache usage is even more reduced, thereby allowing to cache more data and to reduce the IO load even more.

Figure 8:
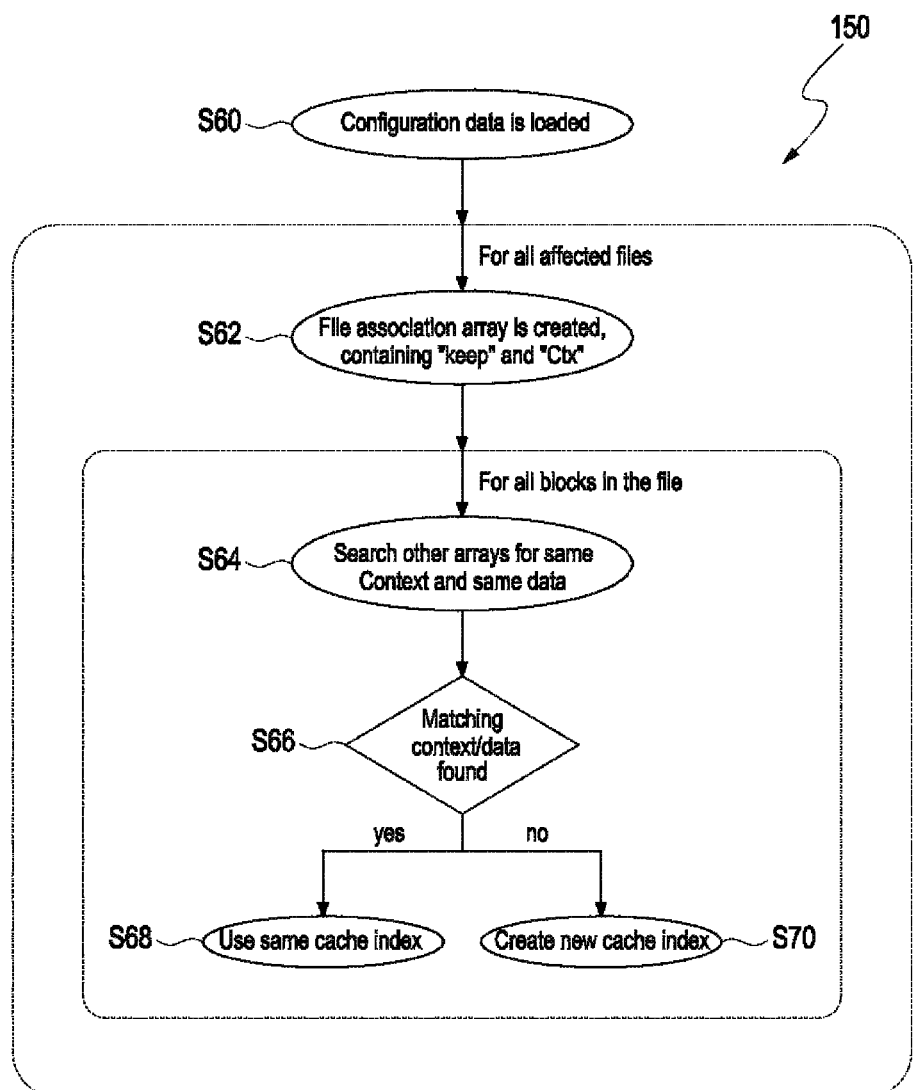
FIG. 8 is a flowchart of operation of a static association table for a cacheable data block/file access method according to the concept shown in FIG. 7.

In a favorable embodiment the communality map may be used as a static association table to be derived prior to virtual machine execution. The algorithm 150 for the static association table procedure is described in the flow chart of FIG. 8.

First the configuration data are loaded in step S60. Then for all affected files a file association array is created containing "keep" and "Ctx", (step S62). For all cacheable data blocks in a file all other arrays are searched to determine if there are the same context and the same data available, (step S64). For the case that matching context and data are found (step S66), the same cache index is used in step S68 (yes in the flow chart), whereas if no matching data are found (no in the flow chart), a new cache index is created in step S70.

In another example embodiment, the communality map may be derived as a dynamic association table during virtual machine execution for a dynamic loading of a new file at runtime. The procedure 160 for the dynamic association table procedure is described in more details in the flow chart of FIG. 9.

Whenever a new cacheable data block or a new file is accessed (step S72), the configuration data has to be interpreted. On a new file, a new mapping row has to be added to the association table. On a new cacheable data block access, only this cacheable data block has to be analyzed. The algorithm to be executed when exploiting this cache merging is more complex as when only optimizing a single file at a time as all existing maps have to be searched to find possible duplicates.

When a new file is accessed, the configuration data is searched to create a matching mapping including cacheable data block and context information (step S74). When a cacheable data block is accessed which does not contain a valid cache index, all other files which apply to the same configuration are searched (step S76). For each file, the corresponding context is searched and the data is compared (step S84). When a match was found (yes in the flow chart), the cache index is duplicated (step S86) and the flow continues with step S88. When no match is found (no in the flow chart), the next file is analyzed (step S80). When no matching file was found (no in the flow chart), a new cache index is created, containing the new data (step S82) followed by continuing with a regular copy-on-read algorithm in step S88. When the cacheable data block is already cached or not to be cached (yes in the flow chart), the flow matches the one shown in FIG. 6 and continues with step S78 searching for the next file in which is followed by step S84.

Figure 9:
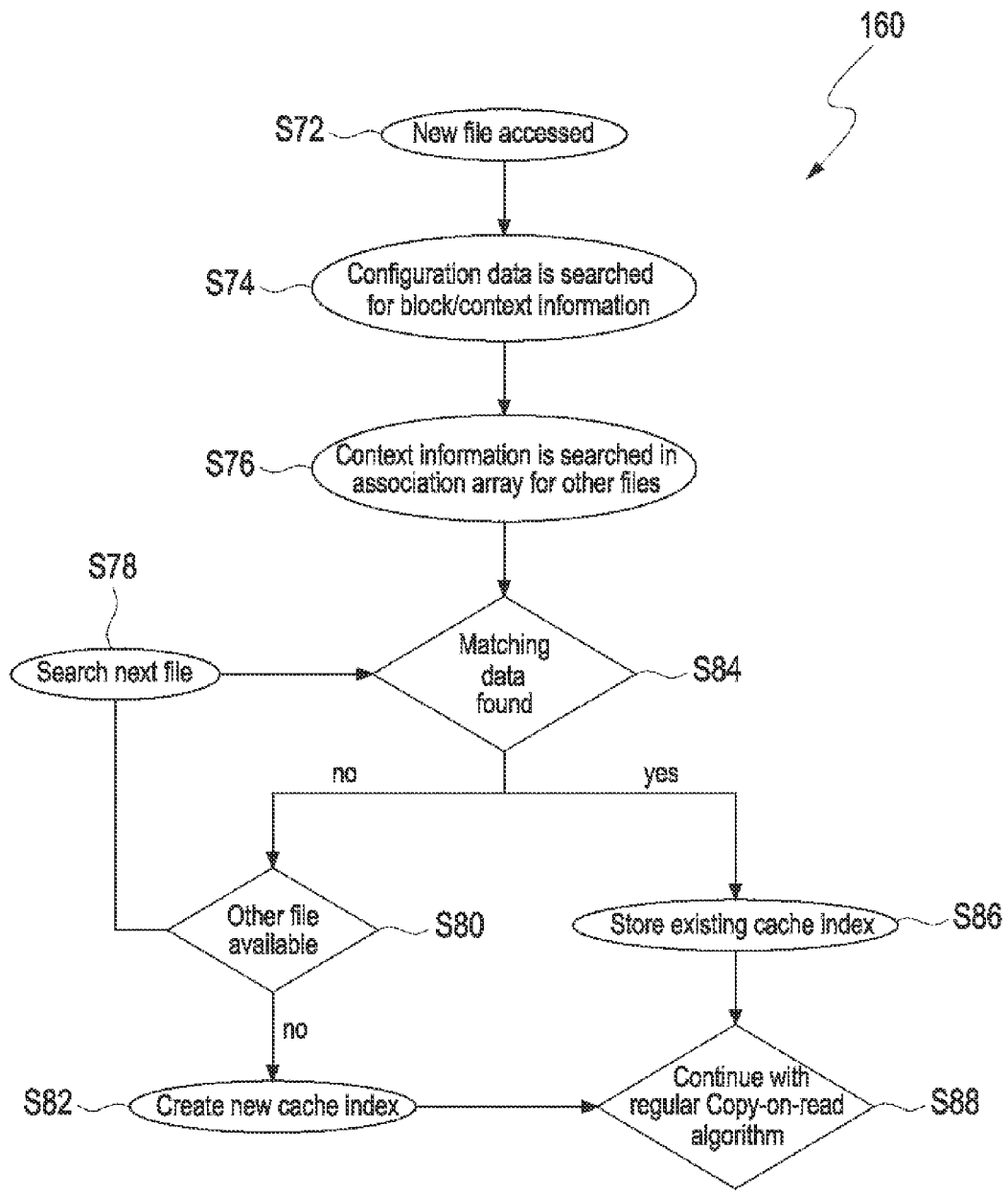
FIG. 9 is a flowchart of operation of a dynamic association table for a cacheable data block/file access method according to the concept shown in FIG. 7.

This can be optimized even further by adding another table, consolidating every context and thereby accelerate searches (not displayed in FIG. 9).

This approach is most valuable for read-only file systems. It can also be applied to write processes to allow a copy-on-write later on in the process. The algorithm for this matches the one for a regular cache in an OS (copy-on-write is already implemented for cache and memory data blocks and a state-of-the-art procedure, e.g. used to optimize a process start).

The advantage over regular caching approaches is that a guaranteed set of data is kept in memory. Standard caches may remove them based on the current usage of the system. By keeping data for important operations in cache all the time, certain performance-critical operations can always be performed fast.

The advantage over existing approaches using copy-on-read is that the set of cacheable data blocks actually stored can be reduced to certain files and to certain cacheable data blocks/files in an image file, thereby reducing the memory usage. As memory is still a limiting factor, reducing its consumption allows more files to be stored in the masking cache layer. The benefits of such an approach is that standard operations on images can be done much faster with less IO operations and caches are used more effectively.

Further, a data processing program for execution in a data processing system 110 is proposed, comprising software code portions for performing the caching method for operating a computer server system 110, comprising at least one host, when the program is run on a computer $100a \ldots 100g$.

According to another aspect of the illustrative embodiments, a computer program product stored on a computer usable medium is proposed, which comprises computer readable program means for causing a computer to perform the following steps when the program is run on a computer server system 110. Particularly the steps comprise (a) providing a masking cache layer 32 between the one or more virtual machines 10 and the virtual machine manager 16, the masking cache layer 32 including at least one separate entry for every cacheable data block 58 of said file system 28 to be referenced; (b) collecting profiling information related to one or more of the cacheable data blocks 58 and storing the profiling information in the masking cache layer 32 and configuring the masking cache layer 32 according to the profiling information, or (c) providing a configuration for the masking cache layer 32.

The invention can take the form of an entirely hardware embodiment, an entirely software embodiment or an embodiment containing both hardware and software elements. In one example embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of networks adapters.

The data processing system comprises software code portions for performing said caching method for operating a computer server system 110 including at least one host 100a-100g coupled to at least one disk 22, one or more virtual machines 10, one or more images 24a-24d of the one or more virtual machines 10 created in a file system 28 of the disk 22, a virtual machine manager 16 for assigning hardware resources of the computer server system 110 to the one or more virtual machines 10. A masking cache layer 32 is provided between the one or more virtual machines 10 and the virtual machine manager 16, the masking cache layer 32 including at least one separate entry for every cacheable data block 58 of said file system 28 to be referenced. Profiling information is collected related to one or more of the cacheable data blocks 58 and stored in the masking cache layer 32 and the masking cache layer 32 configured according to the profiling information, or a configuration for the masking cache layer 32 is provided.

The invention claimed is:

1. A computer program product stored on a non-transitory computer usable medium, comprising computer readable program code for causing a computer to perform the following when the program is run on a computer server system:
    providing a masking cache layer between one or more virtual machines and a virtual machine manager, the masking cache layer including at least one separate entry for each cacheable data block of a disk file system to be referenced;
    collecting file-type-aware profiling information related to access patterns of one or more of the cacheable data blocks based on file types of the one or more the cacheable data blocks;
    storing the file-type-aware profiling information in the masking cache layer; and
    configuring the masking cache layer according to the file-type-aware profiling information.

2. The computer program product of claim 1, wherein the computer program code further causes the computer to:
    provide at least one rule for configuring the masking cache layer according to the at least one rule and configuring the masking cache layer; and
    decide according to the at least one rule whether or not a given cacheable data block is to be kept in the masking cache layer.

3. The computer program product of claim 1, wherein the masking cache layer is implemented as a memory file system configured to represent a file system or a subdirectory of the disk file system.

4. The computer program product of claim 1, wherein the computer program code further causes the computer to:
    generate the configuration by deriving the at least one rule out of profiling information comprising at least one of the following;
        providing information about access patterns of the one or more cacheable data blocks of the disk file system to be referenced;
        providing a counter for profiling data block access rates;
        deriving information about content of the one or more cacheable data blocks for profiling data block access rates;
        deriving information about a file type of a file to be referenced in the disk file system; or
        using path information available for the one or more cacheable data blocks according to a file type to which the one or more cacheable data blocks belong.

5. The computer program product of claim 4, wherein the computer program code further causes the computer to:
    responsive to a read operation related to the one or more cacheable data blocks, determine whether the one or more cacheable data blocks are already stored in the masking cache layer, pass the read operation to the disk file system responsive to the one or more cacheable data blocks not being stored in the masking cache layer, and keep the one or more cacheable data blocks in the masking cache layer responsive to the one or more cacheable data blocks already being stored in the masking cache layer; and
    responsive to a write operation related to the one or more cacheable data blocks, pass the write operation to the disk file system responsive to determining a specification that requires storing the one or more cacheable data blocks changed by the write operation does not exist.

6. The computer program product of claim 1, wherein the computer program code further causes the computer to:
    provide a communality map between at least two or more image files to be used for deciding whether a given cacheable data block is to be kept in the masking cache layer.

7. An apparatus, comprising:
    a processor; and
    a memory coupled to the processor, wherein the memory comprises instructions which, when executed by the processor, cause the processor to:
    provide a masking cache layer between one or more virtual machines and a virtual machine manager, the masking cache layer including at least one separate entry for each cacheable data block of a disk file system to be referenced;
    collect file-type-aware profiling information related to access patterns of one or more of the cacheable data blocks based on file types of the one or more the cacheable data block;
    store the file-type-aware profiling information in the masking cache layer; and
    configure the masking cache layer according to the file-type-aware profiling information.

8. The apparatus of claim 7, wherein the instructions further cause the processor to:
    provide at least one rule for configuring the masking cache layer according to the at least one rule and configuring the masking cache layer; and decide according to the at least one rule whether or not a given cacheable data block is to be kept in the masking cache layer.

9. The apparatus of claim 7, wherein the masking cache layer is implemented as a memory file system configured to represent a file system or a subdirectory of the disk file system.

10. The apparatus of claim 7, wherein the instructions further cause the processor to:
generate the configuration by deriving the at least one rule out of profiling information comprising at least one of the following:
providing information about access patterns of the one or more cacheable data blocks of the disk file system to be referenced;
providing a counter for profiling data block access rates;
deriving information about content of the one or more cacheable data blocks for profiling data block access rates;
deriving information about a file type of a file to be referenced in the disk file system; or
using path information available for the one or more cacheable data blocks according to a file type to which the one or more cacheable data blocks belong.

11. The apparatus of claim 10, wherein the instructions further cause the processor to:
responsive to a read operation related to the one or more cacheable data blocks, determine whether the one or more cacheable data blocks are already stored in the masking cache layer, pass the read operation to the disk file system responsive to the one or more cacheable data blocks not being stored in the masking cache layer, and keep the one or more cacheable data blocks in the masking cache layer responsive to the one or more cacheable data blocks already being stored in the masking cache layer; and
responsive to a write operation related to the one or more cacheable data blocks, pass the write operation to the disk file system responsive to determining a specification that requires storing the one or more cacheable data blocks changed by the write operation does not exist.

12. The apparatus of claim 7, wherein the instructions further cause the processor to:
provide a communality map between at least two or more image files to be used for deciding whether a given cacheable data block is to be kept in the masking cache layer.

13. The computer program product of claim 1, wherein the computer readable program code further causes the computer to:
provide an algorithm derived from the data block access profiling information.

14. The computer program product of claim 1, wherein each cacheable data block represents at least one of a file system image, a database, or a picture.

15. The computer program product of claim 6, wherein the computer readable program code further causes the computer to:
provide the communality map as a static association table to be derived prior to virtual machine execution.

16. The computer program product of claim 6, wherein the computer readable program code further causes the computer to:
provide the communality map to be derived as a dynamic association table during virtual machine execution for a dynamic loading of a new file at runtime.

17. The apparatus of claim 7, wherein the instructions further cause the processor to:
provide an algorithm derived from the data block access profiling information.

18. The apparatus of claim 7, wherein each cacheable data block represents at least one of a file system image, a database, or a picture.

19. The apparatus of claim 12, wherein the instructions further cause the processor to:
provide the communality map as a static association table to be derived prior to virtual machine execution.

20. The apparatus of claim 12, wherein the instructions further cause the processor to:
provide the communality map to be derived as a dynamic association table during virtual machine execution for a dynamic loading of a new file at runtime.

* * * * *